United States Patent
Anup et al.

(10) Patent No.: US 9,563,198 B2
(45) Date of Patent: Feb. 7, 2017

(54) METHOD AND SYSTEM TO MODEL RISK OF UNPLANNED OUTAGES OF POWER GENERATION MACHINE

(75) Inventors: Kumar Anup, Karnataka (IN); Anurag Agarwal, Karnataka (IN)

(73) Assignee: General Electric Company, Schenectady, NY (US)

( * ) Notice: Subject to any disclaimer, the term of this patent is extended or adjusted under 35 U.S.C. 154(b) by 1337 days.

(21) Appl. No.: 13/415,051

(22) Filed: Mar. 8, 2012

(65) Prior Publication Data

US 2013/0238256 A1 Sep. 12, 2013

(51) Int. Cl.
*G06F 19/00* (2011.01)
*G05B 23/02* (2006.01)

(52) U.S. Cl.
CPC ................. *G05B 23/0283* (2013.01)

(58) Field of Classification Search
CPC .................................................. G05B 23/0283
USPC ........................................................ 702/34
See application file for complete search history.

(56) References Cited

U.S. PATENT DOCUMENTS

| | | |
|---|---|---|
| 3,582,928 A | 6/1971 | Gaertner |
| 4,139,822 A | 2/1979 | Urich et al. |
| 4,402,054 A | 8/1983 | Osborne et al. |
| 5,099,436 A | 3/1992 | McCown et al. |
| 5,210,704 A | 5/1993 | Husseiny |
| 5,455,777 A | 10/1995 | Fujiyama et al. |
| 5,644,394 A | 7/1997 | Owens |
| 6,085,154 A | 7/2000 | Leuthausser et al. |
| 6,411,908 B1 | 6/2002 | Talbott |
| 6,468,033 B1 | 10/2002 | Weidlich |
| 6,636,813 B1 | 10/2003 | Isobe et al. |
| 6,643,570 B2 * | 11/2003 | Bangert .................. G06Q 10/06 244/75.1 |

(Continued)

FOREIGN PATENT DOCUMENTS

| | | |
|---|---|---|
| EP | 1 103 926 A2 | 5/2001 |
| EP | 1 418 481 A1 | 5/2004 |

(Continued)

OTHER PUBLICATIONS

"Procedure for Failure Mode, Effects, And Criticality Analysis (FMECA)", Aug. 1966, Reproduced by National Technical Technical Information Service, N70-76197, RA-006-013-1A, pages 1-37.

Alexandra Coppe et al., "Uncertainty Reduction of Damage Growth Properties Using Structural Health Monitoring", Journal of Aircraft, vol. 47, No. 6, Nov.-Dec. 2010, pp. 2030-2038.

(Continued)

*Primary Examiner* — John Breene
*Assistant Examiner* — Yaritza H Perez Bermudez
(74) *Attorney, Agent, or Firm* — Nixon & Vanderhye P.C.

(57) ABSTRACT

A method to determine a risk of failure for a machine including: generating a first value for a risk of failure of the machine, wherein the first value is determined by a first model receiving as an input a condition of the machine and the first model includes a relationship derived from historical machine failures and correlating the input condition of the machine to a value for the risk of failure; generating a second value of the risk of failure of the machine, wherein the second value is determined by a second model receiving as an input information regarding wear or degradation of the machine and the second model includes a relationship correlating the input information regarding wear or degradation to a value for the risk of failure, and determining a total risk of failure based on the first and second values of the risk of failure.

18 Claims, 3 Drawing Sheets

(56) References Cited

U.S. PATENT DOCUMENTS

| | | |
|---|---|---|
| 6,909,994 B2 | 6/2005 | Johnson et al. |
| 7,010,437 B2 | 3/2006 | Lubkeman et al. |
| 7,062,370 B2 | 6/2006 | Vhora et al. |
| 7,082,384 B2 | 7/2006 | Sasaki et al. |
| 7,458,768 B2 | 12/2008 | Dube et al. |
| 7,555,951 B2 | 7/2009 | Shadman et al. |
| 7,662,091 B2 | 2/2010 | Bagley et al. |
| 8,027,820 B2 | 9/2011 | Tryon, III |
| 2003/0216888 A1* | 11/2003 | Ridolfo ............. G05B 23/0283 702/181 |
| 2004/0078167 A1 | 4/2004 | Tan et al. |
| 2006/0178762 A1 | 8/2006 | Wroblewski et al. |
| 2007/0061608 A1 | 3/2007 | Baker et al. |
| 2007/0093988 A1 | 4/2007 | Chakraborty et al. |
| 2008/0004840 A1 | 1/2008 | Pattipatti et al. |
| 2008/0201104 A1* | 8/2008 | Poncet ............... G05B 23/0229 702/181 |
| 2008/0276206 A1 | 11/2008 | Mariani |
| 2011/0196593 A1* | 8/2011 | Jiang ....................... F02C 9/00 701/100 |

FOREIGN PATENT DOCUMENTS

| | | |
|---|---|---|
| EP | 1 544 771 A1 | 8/2005 |
| EP | 1 705 542 A1 | 9/2006 |

OTHER PUBLICATIONS

Dwarakanath Jagannath et al., "A Generic Reliability and Risk Centered Maintenance Framework", Proceedings of the 7th Annual GRASP Symposium, Wichita State University, 2011, pp. 84-85.

Failure Mode and Effects Analysis, Wikipedia, printed Jan. 5, 2012, 5 pages.

David Balevic et al., "Heavy-Duty Gas Turbine Operating and Maintenance Considerations," GER-3620L.1 (Oct. 2010), 59 pages, (2010).

Warren J. MacGillivray et al., "Operation and Maintenance Strategies to Enhance Plant Profitability," GER-3925A, 14 pages, (1996).

R.W. Haskell, "Gas Turbine Compressor Operating Environment and Material Evaluation," GE Turbine Reference Library, (1989).

* cited by examiner

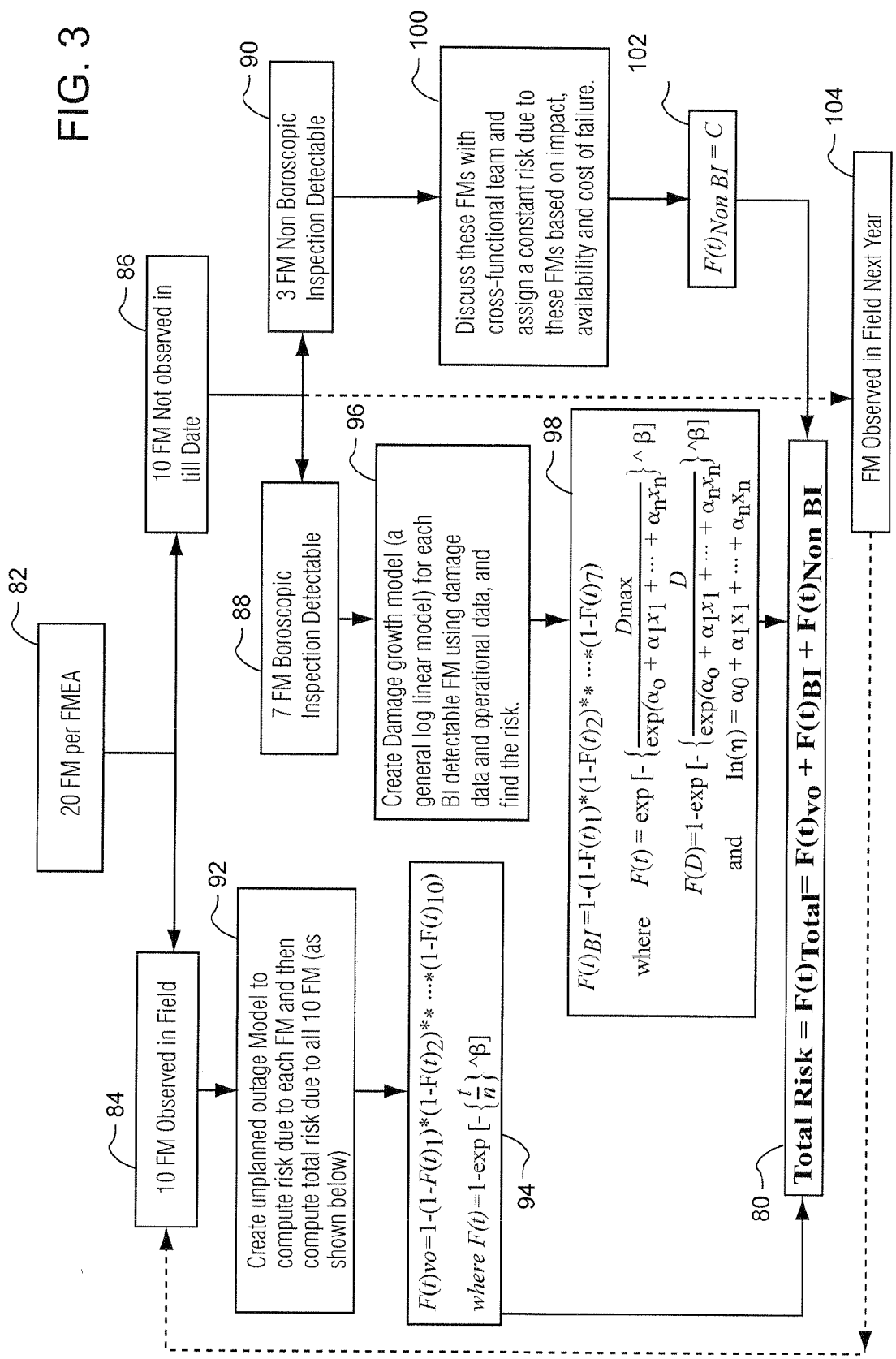

METHOD AND SYSTEM TO MODEL RISK OF UNPLANNED OUTAGES OF POWER GENERATION MACHINE

BACKGROUND OF THE INVENTION

The invention relates to failure mode and effects analyses (FMEA) and particularly to FMEA of rotary power generation units.

Power generation units, and particularly units generating electrical power for utility companies, are often required to operate continuously for extended periods at high levels of reliability. Meeting these requirements is difficult because power generation units are prone to wear and require regular maintenance.

Power generation units typically have large rotating components, operate under extreme conditions, and are subjected to large mechanical and electrical loads. These units wear and will suffer failure if the units are not properly maintained. To avoid failure, the power units are scheduled to be taken off-line for periodic repair and maintenance.

A schedule of the repair and maintenance of power generation units typically involves setting a period during with a unit is continuously operated between successive off-line repair and maintenance events. The duration of this period usually requires a balance of the requirement for reliable operation of the unit and the need for continuous and extended operation. When undergoing repair and maintenance, a power generation unit is off-line and is not generating power for a power grid. If the period between successive off-line repair and maintenance events is too long, the power unit may fail during operation which results in an unplanned outage of power generation. Shortening the period reduces the overall period during which the unit is generating power and reduces the total amount of power generated by the unit over an extended period including one or more off-line sessions.

A calculated risk of failure is conventionally used to determine the period between planned off-line maintenance and repair events for an industrial power generation unit. This risk of failure is used to balance the requirement for reliability of the power unit with the need for generated power.

The calculated risk of failure may be characterized as a risk of the power generation unit suffering an unplanned outage. A power unit suffers an unplanned outage when the unit is taken off-line at a time other than a scheduled off-line period. The unplanned outage is typically due to a failure of a power generation unit operating in the field such as in a power generation plant.

Unplanned outage risk is traditionally determined based on historical data of actual field failures of power generation units. Actual field failures are useful for estimating the risk of failure, but do not accurately account for all risks involved in operating the power generation unit. Some risks are not reflected in the historical failures of units.

To model these other risks a "lurking model" has conventionally been used. For example, the risk to previously unseen failure modes may be estimated using lurking model. The lurking model approach is crude and is based on a hypothetical analysis of unforeseen and unseen modes of failures. A lurking model takes into account the risk associated with those unknown failure mode(s) of the system or system components which may precipitate in future if the system or component is allowed to operate beyond the current known operating experience. The risk is typically estimated by a lurking model using a Weibayes model, which is a type of Weibull model in which the shape parameter, also know as "beta", is assumed. A typical value of beta is relatively high and may be in a range of 3 to 4. The hypothetical analysis used in the lurking model may not anticipate actual unforeseen failure modes of a power generation unit.

There is a long felt and unsolved need for enhanced systems and methods to accurately assess the risk of an unplanned outage failure, and to anticipate the modes of failure that can occur in a power generation unit.

BRIEF DESCRIPTION OF THE INVENTION

A semi-empirical model based approach has been conceived to calculate the reliability of a gas turbine, steam turbine and other power generation unit (collectively referred to as a "machine" or "unit"). The reliability may be calculated in terms of a risk of unplanned outage of the machine. Empirical data of actual wear, degradation and damage occurring in the machine is used to enhance the modeling of machine failure modes. The model may be used to calculate the reliability of the machine and determine an optimal period between off-line maintenance and repair sessions. The model combines data from historical field failures and potential, also referred to as unforeseen, failures based on monitoring the machine, such as by boroscopic inspections. By utilizing data from actual field failures of machines and boroscopic inspections, the models may be used to accurately calculate risks of known and potential failures of a power generation unit.

A method to determine a risk of failure for a machine has been conceived which includes: generating a first value for a risk of failure of the machine, wherein the first value is determined by a first model receiving as an input a condition of the machine and the first model includes a relationship derived from historical machine failures and correlating the input condition of the machine to a value for the risk of failure; generating a second value of the risk of failure of the machine, wherein the second value is determined by a second model receiving as an input information regarding wear or degradation of the machine and the second model includes a relationship correlating the input information regarding wear or degradation to a value for the risk of failure, and determining a total risk of failure based on the first and second values of the risk of failure.

The risk of failure may be a risk that the machine will suffer an unplanned outage risk during a certain period. The may be a power generation unit and the method further includes determining an off-line maintenance interval based on the risk of failure.

The information for the second model may be boroscopic data collected from a boroscopic inspection of the machine. The relationship of second model may correlate data regarding wear or cracks observed in the machine to a value of the risk of failure.

The relationship in the first model is empirically derived from the historical machine failures, wherein the first condition includes an operating duration for the machine and the relationship correlates the operating during of the machine to a level of risk of failure.

A method to determine a total risk of failure for a machine has been conceived including: generating a empirically derived first model of a risk of failure of the machine, wherein the first model includes a relationship derived from historical information regarding machine failures, wherein the relationship provides a level of risk based on an operational condition of the machine; inputting to the first model data regarding an operating value of the operational condition of the machine; generating a first risk value by the first model based on the inputted operating value; generating an empirically derived second model of a risk of failure of the machine, wherein the second model includes a relationship between observed wear or degradation of the machine and a level of risk; periodically inputting to the second model data regarding the observed wear or degradation of the machine; generating a second risk value by the second model based on the inputted data regarding the observed wear or degradation, and determining a total risk of failure based on the first and second values of the risk of failure.

The relationship in the second model may be based on a damage growth model. The input information for the second model may be boroscopic data collected from a boroscopic inspection of the machine. The relationship of second model may correlate data regarding wear or cracks observed in the machine to a value of the risk of failure.

A system to determine a total risk of failure for a machine has been conceived comprising: a boroscopic inspection device; a computer system including a processor and a non-transitory electronic storage device, the processor executing a program stored on the storage device to: generate a empirically derived first model of a risk of failure of the machine, wherein the first model includes a relationship derived from historical information regarding machine failures, wherein the relationship provides a level of risk based on an operational condition of the machine, and the historical information and first model are stored in the storage device; receive inputs to the first model data regarding an operating value of the operational condition of the machine; generate a first risk value by the first model based on the inputted operating value; generate an empirically derived second model of a risk of failure of the machine, wherein the second model includes a relationship between observed wear or degradation of the machine and a level of risk and the second model is stored in the storage device; periodically receive inputs of data collected by the boroscopic instrument, wherein the data indicates wear or degradation of the machine and the data is stored in the storage device; generate a second risk value by the second model based on the inputted data collected by the boroscopic instrument; determine a total risk of failure based on the first and second values of the risk of failure, and display the total risk of failure.

BRIEF DESCRIPTION OF THE DRAWINGS

FIG. 3 is an exemplary process flow chart for determining the total risk for a system or a component of a system that is subject to boroscopic inspection.

DETAILED DESCRIPTION OF THE INVENTION

Figure 1:
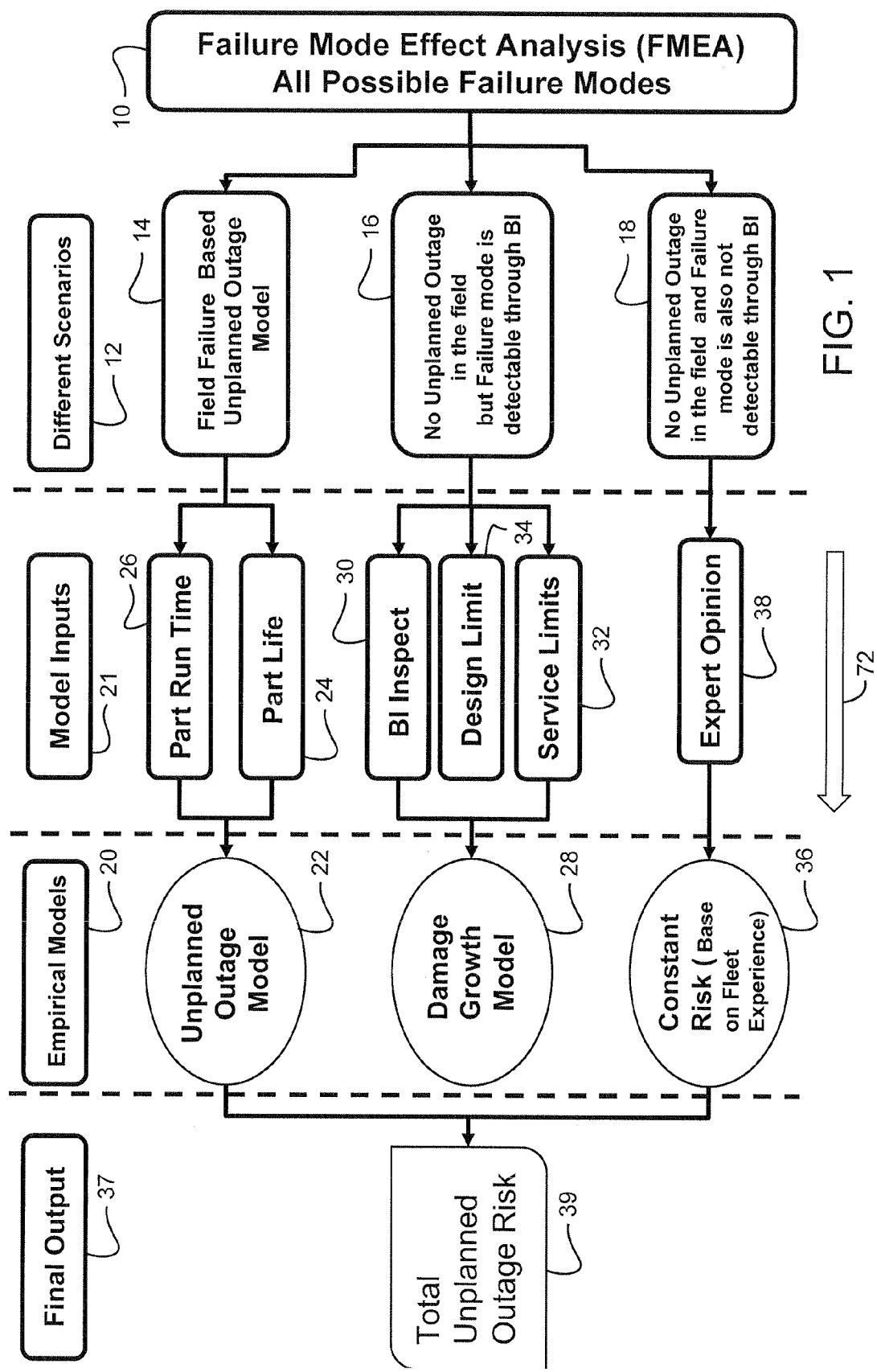
FIG. 1 is a process flow chart mapping steps for determining a risk of unplanned outage of the power generation system.

FIG. 1 is a process map of a method to model various risks to generate a predicted risk of failure, such as a risk of unplanned outage. The process may start by initiating a failure mode and effects analysis (FMEA) 10 to identify and assess the risks of all possible failure modes of a power generation unit, such as a gas and electrical generator. The FMEA is a conventional analysis that a person of ordinary skill in the art, such as an engineer having several years of experience in failure analysis of machinery.

FEMA is a procedure to identify potential failure modes of a power generation unit and estimate the severity and likelihood that each failure mode will occur. Conventionally, a FEMA procedure identifies past failure modes based on based on past failures with the unit and similar units. FMEA 10 may be applied during the design phase of a machine to identify potential fault modes or defects that may cause a unit to fail in field or otherwise have an unplanned outage. The FMEA methodology examines all potential causes of a defect and the likelihood of these causes occurring and resulting in the defect.

An individual or a team of people may be assigned to create a FMEA report or document. Team members can include representatives from disciplines such as engineering and field service. The team members have expertise and experience relevant to determining the risks associated with machines and, particularly, the risks that machine will undergo an unplanned outage. The team members may develop lists of potential failure scenarios for the machine.

The various scenarios of potential failures of the power generation unit are categorized 12 by whether the risk of the failure is to be determined based on historical failure data, data indicating the wear and deterioration of the unit and expert opinion of field engineers. A first failure scenario 14 is based on failures that will cause a field failure of the unit. The second failure scenario 16 includes failures which do not result in a field failure and result in a failure detectable by boroscopic inspection. An internal component failure that does not cause the entire machine to fail may be an example of the second failure scenario.

The third failure scenario 18 is similar to the second failure scenario 16 in that both scenarios are not based on historical field failures of power generation units. The third failure scenario is not detectable by boroscopic inspection or any other inspection technique used to monitor wear and degradation of the power generation unit for the second model.

The three failure scenarios each have a corresponding empirical model which predicts failures in the power generation unit. These models 20 determine a predicted risk of a failure based on data provided to the models. The models may be empirically derived based on prior experience with similar units. The models may include algorithms that convert the inputs 21 to predicted risk values, tables that indicate risk levels for various input values and logic steps, which may be represented in a flow chart, for evaluating risk based on the inputs.

An unplanned outage model 22, e.g., a first empirically derived model, may be used to model the risk of a failure occurring in the field of a power generation unit. The first model 22 is derived from historical data of field failures of power generation units. Unplanned outage models 22 that account for field failures are conventional and well known.

Data indicative of known field failures are input to the unplanned outage model 22. The data may include information regarding the service period (life) 24 for components, e.g. parts, in the machine. Data may also be inputted regarding the operational period (run time) 26 of the machine and each of its internal components.

The data used by the unplanned outage model 22 may also include information regarding the risk of a field failure of the entire unit due to a failure of one or more components. The model 22 may generate a risk level for failure of the entire power generation unit based on the expected component life 24 and the operational period for each component in the unit. The risk level generated by the model 22 may be a risk that a failure of the component will cause an outage of the entire unit.

A second empirically derived model 28 may be used in conjunction with the first model 22 to calculate a level of risk that the power generation unit will fail based on monitored wear and degradation of the unit, rather than on historical field failure data. The second model may predict the growth of wear and deterioration occurring in the machine. The prediction of wear and deterioration generated by the second model is used to adjust or supplement the risk of an unplanned outage generated by the first model 22.

The risk of an unplanned outage is influenced by the wear and deterioration of the machine. While the wear and deterioration of the machine can result in a machine failure, the second model is not derived from historical data of failures of units occurring in the field. The second model accounts for the influence on an unplanned outage due to wear and deterioration of the machine. For example, if the wear and deterioration of the machine is below levels considered normal or rates of wear and deterioration, the second model yields a result that reduces the risk of an unplanned outage generated by the first model 22.

The second model 28, like the first model 22, may be an empirically derived model and comprise relationships, such as algorithms, look-up tables and other mathematical and software tools. The second model 28 receives data regarding wear, deterioration or damage occurring to the power generation unit. The received data may include boroscopic data 30 received from boroscopic inspections of the machine, service limits 32 indicating the amount of acceptable wear of components in the unit, and design limits 34 indicating acceptable limits for wear or deterioration in the machine.

The data 30 obtained by boroscopic inspection may be inputted to and used by the second model 28 to determine whether the wear or deterioration of a component is at or near a service limit 32 or a design limit 34. The second model 28 may also analyze the rate of wear or degradation of the machine to determine an estimated time to failure or if the unit is undergoing abnormal wear or deterioration.

The collected data 30 of the wear and degradation of a unit may be obtained by boroscopic inspections performed periodically on the internal components of the unit. The boroscopic inspection data 30 is used to measure or otherwise determine wear, damage and degradation occurring on the internal components of the unit, especially the moving components of the unit.

The second model 28 may be a damage growth model that determines the risk of failure based on the growth of wear or other deterioration of the power generation unit. A damage growth model may include relationships correlating a risk of failure to the rate of wear, propagation of cracks or other fractures in a unit. These cracks or fractures may be periodically viewed with a bore scope during successive episodes of maintenance and inspection of a unit.

With a bore scope, a technician or engineer may view cracks in internal components and surfaces of a machine. Data 30 collected from the boroscopic inspection can include information related to the location of cracks or fractures in the unit, the number of cracks or fractures in a predefined surface area of the unit, and the length or width of the crack or fracture.

The data 30 from the boroscopic inspection is entered as an input to the second model. The data may include information about the location, number and dimensions of the cracks and fractures. In addition, the data may include time information, such as the date(s) when the boroscopic inspection was performed.

An exemplary algorithm that could be used for the second model 28 is a general log linear model where one of the distribution parameter or life characteristics is expressed as a linear combination of various predictors (X's) such as hours, number of starts, number of trips, an N ratio, temperature and damage as a response variable (Y).

The third model 36 may be empirically derived and is based on expert opinion 38 regarding the power generation unit. The third model accounts for human experience and knowledge regarding the operation of the unit and similar units. The third model may be a constant risk determined by expert opinion 38 for the particular type or model of the power generation unit.

The third model may account for failures of the unit that are not reflected in historical field failures and are not evident from boroscopic inspections of the unit.

The outputs of each of the first, second and third models are combined to yield a final output 37 which may be embodied as a total unplanned outage risk level 39. The total unplanned outage risk level may be used to schedule maintenance and repair of a power generation unit, and specifically the operating period of the unit between scheduled outages for maintenance and repair.

By using three types of empirical models 22, 28 and 36 to account for various failure modes of a unit, the total risk 39 of unplanned outage is calculated based on all potential failure modes including those failures that have not been previously resulted in a field failure. The first model 22, e.g., unplanned outage model, calculates a risk of failure due to failure modes that have been observed in the field. The second model 28, e.g., a damage growth model, calculates the risk due to potential failure modes which may not have yet been observed in filed but are susceptible to inspection in the unit. The third model 26 determines a risk due to those failure modes which have not resulted in a field failure and cannot be observed by inspection.

Figure 2:
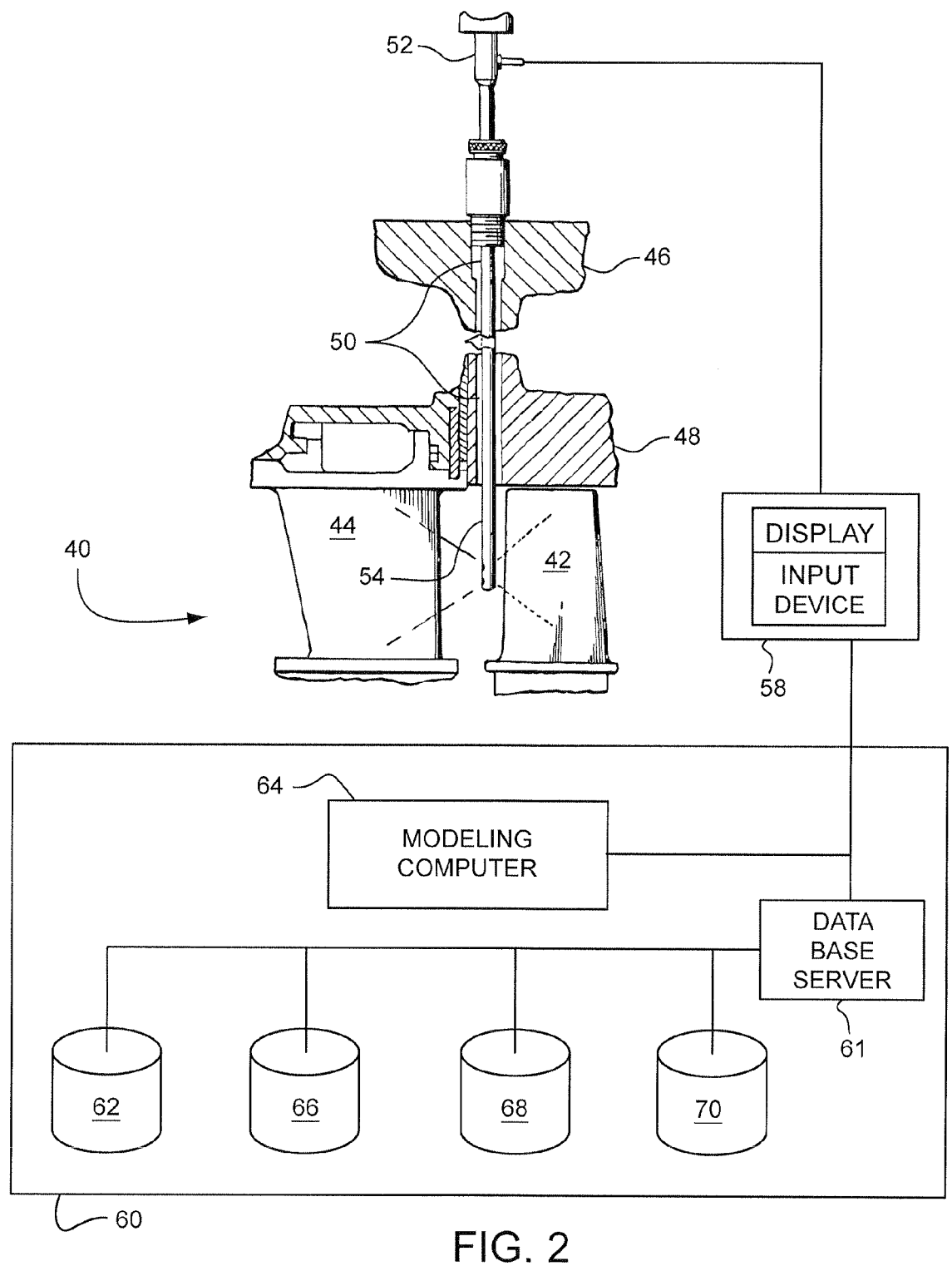
FIG. 2 is a cross-sectional view of a portion of a turbine and a bore scope inspection instrument applied to the gas turbine, and a computer system executing a program to model and analyze the failure modes and risks of failure of the power generation unit.

FIG. 2 illustrates a system for modeling the risk of an unplanned outage, wherein data from inspections of a power generation unit 40 are collected the modeling risk.

The power generation unit 40 may include a turbine, such as in a gas or steam turbine. The turbine includes blades 42, also referred to as buckets, and stators 44, also referred to as nozzles. The components and operation of a power generation unit are well-known to persons of ordinary skill in the art of analyzing risks associated with the operation of these machines. The power generation unit typically includes a casing that includes an outer shell 46 and an inner shell 48. The casing may be generally annular in cross-section. The rotating components, such as the turbine, of the power generation unit are housed in the casing.

An access portal 50 extends through the outer and inner casings. The portal may be sealed while the power generation unit is in operation and while the portal is not being used to inspect the unit. Generally, the portal will be unsealed while the power generation machine is off-line and not rotating. However, data collected from a boroscopic inspection of an operating power generation machine may be used as boroscopic inspection data for modeling risk.

When the access portal is unsealed, the shaft 54 of the bore scope 52 is inserted into the portal and maneuvered to inspect internal components of the unit such as the stators and rotors. The shaft 54 may be flexible such that it can be guided to various interior locations within the outer and inner casing. In the example shown in FIG. 2, the shaft is maneuvered to an annular area between a row of stators and blades.

A sensor 56 at the tip of the shaft collects data regarding components, e.g., turbine and stator, proximate to the sensor. The sensor may be a light or infrared sensor, such as a camera or lens, which collects or presents images of the surface of the components. The sensor may be an x-ray sensor, an ultrasonic sensor, an eddy current sensor, an acoustic sensor or other device that collects information regarding the internal components of the power generation unit, such as the wear and degradation of the surfaces of the components.

The data may be automatically collected or manually generated by a technician using the bore scope to inspect the components. As an example, a technician may view and measure the number of cracks and the length of cracks in the surface of a turbine blade, or measure the depth of wear on a surface of the turbine blade. The measurements are entered into a computer 58 having a display and a user interface device.

The computer 58 transmits the entered measurements to a central computer system 60 that includes a database computer server 61 and electronic storage for storing various databases, including a database 62 of boroscopic data collected from the inspections of the unit and from similar units. The database 62 stores the measurements constituting the boroscopic data and correlates the data to the location in the unit where the data was observed and the date and time of the collection of the data.

The boroscopic data stored in the database 62 is used by a computer 64 that generates and runs the various risk models. Other databases may be used to electronically store data regarding service and design limits of the components in the power generation machine (database 66), the operational history of each power generation unit including the operating time of the unit and the time since last maintenance of the machine (database 68), and historical data regarding field failures of the power generation unit and similar machines (database 70).

As the power generation unit is taken off line, a boroscopic inspection may be performed of various internal components of the unit. The data obtained from the inspection is stored in the database 62 for the boroscopic data. This data may be used to enhance the damage growth model. The newly acquired boroscopic data is used to determine the risk level when the total risk is next determined.

FIG. 3 shows an exemplary application of estimating the total risk 80 based on twenty (20) failure modes (FM) determined by a failure mode effects analysis (FMEA) 82. FIG. 3 shows how the risks from the three models may be combined using laws of probability.

In the example shown in FIG. 3, the twenty (20) potential failure modes identified in the FMEA are categorized as ten (10) failure modes 84 that have been observed in the field and ten failure modes 86 that have not been observed in the field. Of those not observed in the field, seven (7) are further categorized as failure modes 88 which may be detected by boroscopic inspection and three (3) failure modes 90 that are not detectable by boroscopic inspection.

With respect to the failure modes 84 that have been observed in the field, an unplanned outage model is created 92 and the risk is calculated for each of the observed failure modes. The risk of failure for each of the failure mode may be modeled as:

$$F(t) = 1 - \exp\left[-\left\{\frac{t}{\eta}\right\} \wedge \beta\right]$$

Where t is time, η and β are Weibull distribution parameters empirically derived based on prior observed failures of the corresponding failure mode.

A value of one minus the risk of failure (F(t)) for each failure mode 84 is calculated. These values are multiplied together and then subtracted from one (1) to calculate a risk of failure $(F(t)_{UO})$ 94 attributable to the observed failure modes.

With respect to the seven failure modes 88 that are susceptible to boroscopic inspection, a damage growth model 96 is created to estimate the risk of failure based on the damage detected by periodic boroscopic inspection. The damage growth model may be based on a Weibull-general log linear (Weibull-GLL) algorithms 98, such as presented below:

$$F(D) = 1 - \exp\left[-\left\{\frac{D}{\exp(\alpha o + \alpha 1 x 1 + \ldots + \alpha n x n)}\right\} \wedge \beta\right] \text{ and}$$

$$\ln(\eta) = \alpha o + \alpha 1 \chi 1 + \ldots + \alpha n x n$$

Where $\alpha_n$ represents coefficients from Weibull-GLL model for Weibull parameter eta (q), $x_n$ represent damage predictors such as hours, starts, trips, etc., β represents a Weibull distribution parameter, and D is the damage boroscopic measurement data, such as a measured crack length of an internal component.

Once a damage growth models for each of the failure modes 88 are developed, the risk of a forced outage due to each of the failure modes 88 at a given time is calculated using the critical damage value $(D_{max})$ for the respective failure mode using below formula.

$$F(t) = \exp\left[-\left\{\frac{D\max}{\exp(\alpha o + \alpha 1 x 1 + \ldots + \alpha n x n)}\right\} \wedge \beta\right]$$

A value of one minus the risk of failure (F(t)) for each failure mode 88 is calculated. These values are multiplied together and then subtracted from one (1) to calculate a risk of failure $(F(t)_{BI})$ 94 attributable to the observed failure modes.

With respect to the three failure modes 90 that have not been previously observed in the field and are not susceptible to boroscopic inspection, a determination 100 is made of a constant risk value attributable to these three failure modes. The determination 100 may be made based on a discussion of each of the three failure modes with a team of people having various skills, e.g., safety review, design of the system or component and field operation of the system. The team made consider the impact of each failure, the availability of repair or replacement components to correct a failure and the cost associated with a failure. From its consideration, the team may determine a constant risk value (C) for the risk of failure $(Ft)_{Non-BI})$ 102

The total risk of failure model 80 as a function of time (t) is the sum of the risk of failures determined from the models based on the observed failure modes (model 94), the failure modes susceptible to boroscopic inspection (model 98) and the failure modes which have not been observed and are not suitable for boroscopic inspection (model 102).

The various risk models may be updated and run periodically (see arrow 72 in FIG. 1) to update the risk of an unplanned outage. The risk models may be run with data of wear and degradation obtained from current and historical boroscopic inspections. Further, the failure modes may be periodically evaluated 104, such as annually, to determine if any of the previously unobserved failures 86 have been observed in the field. If a failure mode is observed, the mode may be shifted from the unobserved failure modes 86 to the observed failure modes 84. The updated risk modes, with current boroscopic data and shifting of failure modes, may be run periodically to determine the period between scheduled outages of the power generation unit.

Once total risk of failure model as a function of time is available, the risk of the system at any point in time can be calculated. That risk can be compared with a predetermined threshold risk or acceptable risk (say 40% or 50%). The time at which model risk exceeds this acceptable risk will be the time for schedule maintenance.

An engineer or technician may use the computer 58 to run the various risk models stored on the modeling computer 64 which generated a total risk of unplanned outage, which may be displayed in terms of a risk over a period of time.

A technical effect achieved by the disclosed method to model various risks is the generation of a predicted total risk of failure, such as a total risk of unplanned outage. Based on the total risk, a determination may be made that the power generation machine should be taken off line for maintenance and repair. The determination may be that the machine is to be taken off line when the risk is projected to reach a threshold risk level.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method to determine an optimum period for off-line repair and/or maintenance of a power generation machine including a turbine, comprising:
    providing a turbine including rotating components configured to generate power;
    inserting a bore scope into an internal portion of the turbine to inspect internal components of the turbine;
    observing a plurality of failure modes for the machine over a predetermined period of time;
    compiling a first record of the plurality of failure modes for the machine over a predetermined period of time;
    generating a first value for a risk of failure of the machine, wherein the first value is determined by a first model including a relationship derived from the first record of the plurality of failure modes including historical failures and correlating the input condition of the machine to a value for the risk of failure;
    monitoring wear or degradation of the machine with the bore scope at least a first time;
    recording a second record of the wear or degradation monitored at least a first time;
    generating a second value of the risk of failure of the machine, wherein the second value is determined by a second model including a relationship correlating the second record regarding wear or degradation to a value for the risk of failure; and
    determining a total calculated risk of failure based on the first and second values of the risk of failure;
    setting a threshold risk level of the risk of failure; and
    taking the machine off-line for repairs and/or maintenance when the total calculated risk of failure exceeds the threshold risk level.

2. The method of claim 1, wherein the risk of failure is a risk that the machine will suffer an unplanned outage risk during a certain period.

3. The method of claim 1, wherein the machine is a power generation unit and the method further includes determining an off-line maintenance interval based on the risk of failure.

4. The method of claim 1, wherein the second record used by the second model is boroscopic data collected from a boroscopic inspection of the machine.

5. The method of claim 1, wherein the relationship in the first model is empirically derived from historical machine failures, wherein the first condition includes an operating duration for the machine and the relationship correlates the operating duration of the machine to a level of risk of failure.

6. The method of claim 1, wherein the second model is an empirically derived model.

7. The method of claim 1, wherein the relationship of second model correlates data regarding wear or cracks observed in the machine to a value of the risk of failure.

8. A method to determine an optimum period for off-line repair and/or maintenance of a power generation machine including a turbine, the method comprising:
    providing a turbine including rotating components configured to generate power;
    inserting a bore scope into an internal portion of the turbine to inspect internal components of the turbine;
    generating an empirically derived first model of a risk of failure of the machine, wherein the first model includes a relationship derived from historical information regarding machine failures based on an operational condition of the machine;
    inputting to the first model data regarding an operating value of the operational condition of the machine;
    generating a first value for the risk of failure using the first model;
    generating an empirically derived second model of a risk of failure of the machine;
    periodically inputting to the second model data regarding wear or degradation of the machine observed with the bore scope, wherein the second model includes a relationship between the observed wear or degradation of the machine and a risk of failure of the machine;
    generating a second value for the risk of failure using the second model;
    determining a total risk of failure based on the first value and the second value;
    alerting an operator of the machine if the total risk of failure exceeds a predetermined threshold for acceptable risk of failure; and
    taking the machine off-line for repairs and/or maintenance when the total risk of failure exceeds the predetermined threshold for acceptable risk of failure.

9. The method of claim 8, wherein the relationship in the second model is based on a damage growth model.

10. The method of claim 8, wherein the risk of failure is a risk that the machine will suffer an unplanned outage risk during a certain period.

11. The method of claim 8, wherein the machine is a power generation machine and the method further includes determining an off-line maintenance interval based on the risk of failure.

12. The method of claim 8, wherein the relationship in the first model is empirically derived from historical machine failures, wherein the first condition includes an operating duration for the machine and the relationship correlates the operating duration of the machine to a level of a risk of failure.

13. The method of claim 8, wherein the second model is an empirically derived model.

14. The method of claim 8, wherein the relationship of second model correlates data regarding wear or cracks observed in the machine to a value of the risk of failure.

15. A system to determine an optimum period for off-line repair and/or maintenance of a power generation machine including a turbine, the system comprising:
- a turbine including rotating components configured to generate power;
- a boroscopic inspection device to inspect internal components of the turbine;
- a computer system including a processor and a non-transitory electronic storage device, the processor executing a program stored on the storage device to:
  - generate a empirically derived first model of a risk of failure of the machine, wherein the first model includes a relationship derived from historical information regarding machine failures, wherein the relationship provides a level of a risk of failure based on an operational condition of the machine, and the historical information and first model are stored in the storage device;
  - receive inputs to the first model data regarding an operating value of the operational condition of the machine;
  - generate a first value for a risk of failure using the first model based on the inputted operating value;
  - periodically receive inputs of data collected by the boroscopic instrument, wherein the data indicates wear or degradation of the machine and the data is stored in the storage device;
  - generate an empirically derived second model of a risk of failure of the machine, wherein the second model includes a relationship between the observed wear or degradation of the machine and a level of a risk of failure and the second model is stored in the storage device;
  - generate a second value for a risk of failure using the second model based on the inputted data collected by the boroscopic instrument;
  - determine a total risk of failure utilizing the first value and the second value;
  - display the total risk of failure such that it may be compared with a predetermined acceptable level of a risk of failure of the machine;
  - setting a threshold risk level of the risk of failure, wherein the machine is taken off-line for repairs and/or maintenance when the total determined risk of failure exceeds the threshold risk level of the risk of failure.

16. The system of claim 15, wherein the relationship in the second model is based on a damage growth model.

17. The system of claim 15, wherein the risk of failure is a risk that the machine will suffer an unplanned outage during a predetermined period.

18. The system of claim 15, wherein the relationship of the second model correlates data regarding wear or cracks in the machine to a value of the risk of failure, and the data collected by the boroscopic inspection device includes data indicative of wear or cracks in the machine.

* * * * *

UNITED STATES PATENT AND TRADEMARK OFFICE
CERTIFICATE OF CORRECTION

PATENT NO. : 9,563,198 B2
APPLICATION NO. : 13/415051
DATED : February 7, 2017
INVENTOR(S) : Anup et al.

Page 1 of 1

It is certified that error appears in the above-identified patent and that said Letters Patent is hereby corrected as shown below:

At Column 8, Line 29, change "Weibull parameter eta (q)" to --Weibull parameter eta (η)--

Signed and Sealed this
Eleventh Day of April, 2017

Michelle K. Lee
*Director of the United States Patent and Trademark Office*